3,405,194
PROCESS FOR PREPARING HEXADIENES FROM CONJUGATED DIOLEFINIC HYDROCARBONS AND α-MONOOLEFINS
Masao Iwamoto and Sadao Yuguchi, Ohtsu-shi, Japan, assignors to Toyo Rayon Kabushiki Kaisha, Tokyo, Japan, a corporation of Japan
No Drawing. Filed Oct. 7, 1965, Ser. No. 493,914
Claims priority, application Japan, Oct. 9, 1964, 39/57,334; Oct. 22, 1964, 39/59,697; Dec. 10, 1964, 39/69,146; Dec. 29, 1964, 39/74,567; Jan. 8, 1965, 40/615; Jan. 21, 1965, 40/2,768; Mar. 5, 1965, 40/12,363, 40/12,366; Mar. 22, 1965, 40/16,297; Apr. 8, 1965, 40/20,284
11 Claims. (Cl. 260—680)

ABSTRACT OF THE DISCLOSURE

A method of producing hexadienes by the reaction of an α-monoolefin with a conjugated diolefin in the presence of a three-component catalyst comprising (1) a salt of cobalt or iron, (2) a tertiary phosphine or an oxide thereof wherein said phosphine has two phosphorus atoms and (3) an organoaluminum compound.

---

This invention relates to a process for preparing hexadienes. More particularly, the invention relates to a process for preparing hexadienes in good yield by reacting alpha-olefins with conjugated diolefinic hydrocarbons in the presence of a new catalyst composition consisting of a certain compound of cobalt or iron, a certain organophosphorus compound and an organoaluminum compound.

The hexadienes are compounds having various valuable uses as intermediates. Recently, the 1,4-hexadienes have been attracting attention particularly as the third component for imparting sulfur vulcanizability to the ethylene-propylene copolymer, the so-called ethylene-propylene rubber.

It has been known to prepare 1,4-hexadienes by reacting ethylene with 1,3-butadiene in the presence of prescribed catalysts. For example, U.S. Patent 3,152,195 discloses a process wherein rhodium chloride is used as the catalysts. On the other hand, French patent specification 1,388,305 discloses a process wherein a combination of a nickel-phosphorus complex and an organometallic compound is used as the catalyst.

However, the rhodium chloride which is used as the catalyst in the former process is very costly. Hence the production cost inevitably rises when this compound is used. On the other hand, in the latter process the selectivity for the intended hexadienes is not satisfactory.

It is therefore an object of the present invention to provide a process for obtaining the intended hexadienes in good yield and with high selectivity by reacting alpha-olefins with conjugated diolefinic hydrocarbons in the presence of a new catalyst of low cost.

Another object of this invention is to provide a new catalyst composition which not only is inexpensive but whose activity is exceedingly great.

Other objects and advantages of the present invention will become apparent from the following description.

The foregoing objects are attained by a process for preparing hexadienes in accordance with the present invention, which comprises reacting an alpha-olefin with a conjugated diolefinic hydrocarbon in the presence of a catalytic amount of a three-component composition comprising:

(1) (a) a compound of the formula $M(C_5H_7O_2)_n$
where M is cobalt or iron, and $n$ is an integer equal to the valence of said metal; or (b) a compound of the formula $MX_n$
where X is halogen and M and $n$ have the meanings defined above;

(2) an organophosphorus compound having either the formula

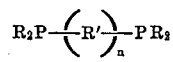

or

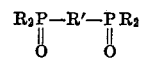

where R is either alkyl or aryl, R' is alkylene, alkenylene or arylene group, and $n$ is an integer either 0 or 1; and (3) an organoaluminum compound having the formula $$R''_mAlZ_{3-m}$$

where R'' is a monovalent hydrocarbon radical, Z is either hydrogen or halogen, and $m$ is a numeral from 1 to 3.

Of the iron or cobalt compounds that are used as the first component of the catalyst in the present invention, the acetylacetonate complex having the formula $$M(C_5H_7O_2)_n$$

include such as

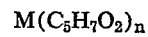

and

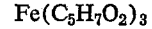

As the halogenide of the formula $MX_n$, included are the chlorides such as $FeCl_2$, $FeCl_3$, $CoCl_2$ and $CoCl_3$, the bromides such as $FeBr_2$, $FeBr_3$, $CoBr_2$ and $CoBr_3$ and the iodides such as $FeI_2$, $FeI_3$, $CoI_2$ and $CoI_3$. Of the foregoing compounds, particularly preferred in the invention process are the trivalent iron compounds, i.e. $FeCl_3$, $FeBr_3$ and $Fe(C_5H_7O_2)_3$, the divalent halogenides of cobalt, i.e. $CoCl_2$ and $CoBr_2$, and the acetyl acetonate complexes of cobalt, i.e. $Co(C_5H_7O_2)_2$ and $Co(C_5H_7O_2)_3$.

The aforesaid tertiary diphosphines having the formula $R_2P(R')_nPR_2$, which are used as the second component of the catalyst in the present invention, are exemplified by 1,1-bis(diphenylphosphino) methane, 1,2 - bis(diphenylphosphino)ethane, 1,2 - bis(diethylphosphino) ethane, 1,2 - bis(diphenylphosphino)ethylene, 1,3 - bis(diphenylphosphino) propane, 1,4 - bis(diphenylphosphino)butane, 1,5 - bis(diphenylphosphino) benzene, tetramethyl biphosphine and tetraethyl biphosphine.

In general, when $n$ is 1 in the foregoing formula, R is preferably a phenyl group, while R' is preferably an alkylene group of 1–4 carbon atoms, or a phenylene group. Of these, it is particularly preferred where R is a phenyl group and R' is a propylene or ethylene group.

On the other hand, when $n$ is 0, it is preferred that the aforesaid R is an alkyl group of 1–4 carbon atoms. Thus, of the foregoing compounds, conveniently usable are the 1,2 - bis(diphenylphosphino)ethane, 1,3- or 1,2-bis(diphenylphosphino)ethane, 1,3- or 1,2 - bis(diphenylphosphino)propane, 1,2-bis(diphenylphosphino)ethylene, 1,2-bis(dihenylphosphino)benzene and tetraethyl bisphosphine.

On the other hand, the phosphoryl derivative represented by the formula

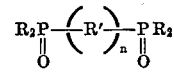

the other of the second component of the catalyst, include typically such as 1,1 - bis(diphenylphosphoryl)methane, 1,2-bis(diphenylphosphoryl)ethane, 1,3-bis(diphenylphosphoryl)propane, 1,4 - bis(diphenylphoshoryl)butane, 1,2-bis(dihenylphosphoryl)benzene and tetraethyl diphosphoryl.

In the foregoing formula, it is generally preferred that R' is an alkylene group of 1–4 carbon atoms and R is a phenyl group. Thus, of the foregoing compounds, those usable with particular convenience are the 1,2-bis(diphenylphosphoryl)ethane and 1,3 - bis(diphenylphosphoryl)propane.

On the other hand, the aforesaid organoaluminum compounds of the formula $R_mAlZ_{3-m}$, the third component of the catalyst, are preferably those in which the R is an alkyl group, and particularly a lower alkyl group. Examples of these compounds include the trialkylaluminums such as triethylaluminum, tri-n-propylaluminum, triisopropylaluminum, and triisobutylaluminum, the dialkylaluminum monohalides such as diethylaluminum monochloride, diethylaluminum monobromide, diethylaluminum monoiodide, diisobutylaluminum monochloride and diisobutylaluminum monobromide, the alkylaluminum dihalides such as ethylaluminum dichloride, ethylaluminum dibromide, isobutylaluminum dichloride, isobutylaluminum dibromide and isobutyl aluminum diiodide, the alkylaluminum sesquihalides such as ethylaluminum sesquichloride, ethylaluminum sesquibromide, isobutylaluminum sesquibromide and hexlyaluminum sesquichloride, and the alkylaluminum hydrides such as diethylaluminum hydride and diisobutylaluminum hydride. These compounds can be used alone or as a mixture.

Of the foregoing compounds, the trialkylaluminums, dialkylaluminum monohalides and alkylaluminum sequihalides are easily available and can generally be used with convenience in this invention.

Although the optimum molar ratio condition of the aforesaid three components to be added to make up the catalyst in the process of the present invention will differ somewhat in accordance with the specific compounds chosen for said components, generally speaking, good results can usually be obtained when the molar ratio of the organophosphorus compound to the cobalt or iron compound (P/Metal) is 0.1:1 to 5:1, preferably 0.5:1 to 2:1 and that of the organoaluminum compound to the cobalt or iron compound (Al/Metal) is 0.5:1 to 200:1, preferably 5:1 to 100:1.

These catalyst components either may be added directly to the reaction system or the three components may be prepared as a mixture in advance to their addition to the system. In the instance particularly when the cobalt or iron halide of the formula $MX_n$ is used as the first component of the catalyst, exceedingly good results are obtained by reacting the halide with the organophosphorus compound, the second component, to form a complex of either the formula $[MX_n]_x[R_2P(R')_nPR_2]_y$ or the formula

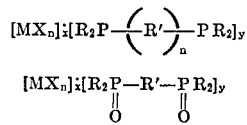

$$[MX_n]_x[R_2P-R'-PR_2]_y$$
$$\quad\quad\quad\overset{\|}{O}\quad\overset{\|}{O}$$

where the proportion of $x$ to $y$ is 1:1 or 1:2, and this is used in combination with the organoaluminum compound.

Examples of particularly suitable combinations of the foregoing catalyst components include:

$CoCl_2$(or $CoI_2$)—$(C_6H_5)_2P\cdot CH_2CH_2CH_2\cdot$
$\quad\quad\quad\quad\quad\quad\quad\quad P(C_6H_5)_2$—$CH_3Al$ $CoCl_2$(or $FeCl_3$)—$(C_6H_5)_2P\cdot CH_2CH_2\cdot$
$\quad\quad\quad\quad\quad\quad\quad\quad P(C_6H_5)_2$—$(C_2H_5)_3Al$

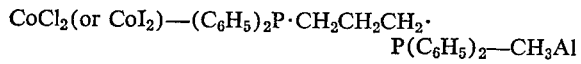

and

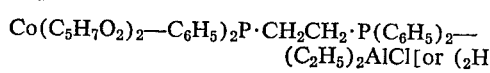

In the process of the present invention, alpha-olefins are reacted with conjugated diolefinic hydrocarbons in the presence of a catalytic amount of the foregoing three-component catalyst.

The alpha-olefins, which are used in the present invention as the starting material, are those hydrocarbons of the formula $R$—$CH=CH_2$, where R is hydrogen or an alkyl group of 1–8 carbon atoms. Included, for example, are ethylene, propylene, butene-1, pentene-1, hexene-1 and heptene-1, particularly preferred being ethylene and propylene.

The conjugated diolefinic hydrocarbons, which are used in this invention as the other starting material, are either 1,3-butadiene or the alkyl or aryl-substituted 1,3-butadienes. Of these compounds, those suitably used in the invention process are 1,3-butadiene and the 2-alkyl-1,3-butadienes, 4-alkyl-1,3-butadienes, 2,3-dialkyl-1,3-butadienes, 1,4 - dialkyl - 1,3-butadiene and 2,4-dialkyl-1,3-butadiene (the alkyl groups here indicated are those of 1–20 carbon atoms, and preferably 1–6 carbon atoms). Thus, as typical compounds can be mentioned 1,3-butadiene, isoprene, 2-ethyl-1,3-butadiene, 1,3-pentadiene, 1,3-hexadiene, 2,4-hexadiene, 2,3 - dimethyl - 1,3 - butadiene, 2,3-diethyl-1,3-butadiene and 2-methyl-1,3-pentadiene. Moreover, as aryl-substituted-1,3-butadiene, 2-phenyl-1,3-butadiene may be used. Generally, the use of 1,3-butadiene and isoprene is to be preferred.

The alpha-olefins and conjugated diolefinic hydrocarbons are reacted stoichiometrically of course, but it not necessarily required that these reactants are present in the reaction system in equivalent quantities. For example, the reaction may be made to proceed by merely introducing the alpha-olefin into the reaction system, in the case where the total amount of the conjugated diolefinic hydrocarbon has been added to the system in advance.

The amount of the catalyst used relative to these starting materials will vary depending upon the particular catalyst system used but, generally speaking, it is usually preferred that the cobalt or iron salt be present in an amount of $10^{-5}$ to $10^{-1}$ moles, and particularly $10^{-4}$ to $10^{-2}$ moles to every one mol of the conjugated diolefinic hydrocarbon.

In those instances where the conjugated diolefinic hydrocarbon is liquified in the reaction system, the use of a solvent may be dispensed with. However, for minimizing as much as possible the occurrence of a reaction between the conjugated diolefinic hydrocarbon and enhancing the amount formed of the intended hexadienes, it is preferred to use a suitable solvent, consideration being given to the dispersibility and solubility of the catalyst.

Conveniently usable as such a solvent are the hydrocarbons such as pentane, heptane, cyclohexane, benzene, toluene and xylene and the halogenated hydrocarbons such as chlorobenzene, bromobenzene, methylene chloride, 1,2-dichloroethane and 1,3-dichloropropane. Further, if a substance which is gaseous at room temperature such as propane and butane is used as the solvent, the separation of the solvent by means of distillation is made much more easy.

On the other hand, it was found that when the intended hexadiene was hexadiene-1,4 the selectivity for hexadiene-1,4 was enhanced still more when the reaction was carried out in the presence of a halogenated hydrocarbon. Furthermore, since these solvents dissolve the aforementioned cobalt complex completely, there was also the advantage that the handling of the catalyst was made easier.

According to the present invention, there are no particular restrictions as to the reaction temperature and pressure as well as the other reaction conditions, variation of these conditions over a broad range being possible.

A reaction temperature ranging between —10° and 250° C. is convenient, a range between 10° and 100° C. being especially desirable. On the other hand, the reaction pressure may be either normal atmospheric or superatmospheric. In general, a pressure of 5–300 kg. per square centimeter is conveniently used depending upon the alpha-olefin used.

Thus the desired hexadienes can be synthesized by the invention process by suitably varying the conditions within the ranges indicated hereinabove. For example, when ethylene is used as the alpha-olefin, the relationship between the class of the conjugated diolefinic hydrocarbon used and the resulting hexadienes are, in general, as follows.

(1) 1,3-butadiene→1,4-hexadiene, 2,4-hexadiene, 1,3-hexadiene.
(2) 2-alkyl-1,3-butadiene→5-alkyl-1,4-hexadiene, 4-alkyl-1,4-hexadiene, 2-alkyl-2,4-hexadiene, 3-alkyl-2,4-hexadiene
(3) 4-alkyl-1,3-butadiene→3-alkyl-1,4-hexadiene, 6-alkyl-1,4-hexadiene, 3-alkyl-2,4-hexadiene, 6-alkyl-2,4-hexadiene
(4) 2,3-dialkyl-1,3-butadiene→4,5-dialkyl-1,4-hexadiene, 2,3-dialkyl-2,4-hexadiene
(5) 1,4-dialkyl-1,3-butadiene→4,6-dialkyl-1,4-hexadiene, 3,5-dialkyl-1,4-hexadiene
(6) 2-phenyl-1,3-butadiene→4-phenyl-1,4-hexadiene On the other hand, when propylene is used as the alpha-olefin, the hexadiene obtained is as follows:

butadiene→2-methyl-1,4-hexadiene and 2-methyl-1,3-hexadiene.

Further, as the conjugate diolefinic hydrocarbon it is also possible to use, for example, the hexadiene-2,4 obtained by isomerization of hexadiene-1,4. Thus, according to this invention, such hexadienes can also be reacted further with ethylene.

The proportion with which the products are obtained from the same starting materials can be varied over a broad range by means of the choice and combination of the catalyst components, the choice of solvent as previously noted, and changes in the reaction conditions.

The critical feature of the present invention resides in the point that a catalyst composition containing a specific organophosphorus compound, i.e. a tertiary phosphine or tertiary phosphoryl, is used. In consequence of the use of such a catalyst system, the formation of by-products as a result of the dimerization or polymerization of the conjugated diolefinic hydrocarbon is extremely small, and the yield (seeictivity) or hexadiene per diolefin reacted becomes as much as 85 to 97%. Thus the selectivity for the intended hexadiene also becomes very high. For example, when preparing hexadiene-1,4 from butadiene-1,3, the selectivity for hexadiene-1,4 becomes as high as 85–95%, a value markedly superior to the less than 70% that was generally attained by the conventional methods.

According to the present invention, it is possible to provide, as hereinbefore described, a broad range of hexadienes on a commercial scale, using a low-cost catalyst. The so obtained hexadienes, for example, hexadiene-1,4, are useful without further treatment as monomers for polymerization or copolymerization in the plastic, rubber, textile and adhesive fields. In addition, they are also important as intermediates of those valuable compounds having two functional groups.

For a clear understanding of the present invention, the following examples are given. Unless otherwise indicated, the percentages are on a weight basis.

Example 1

0.19 gram of a dark green crystalline complex of the formula $CoCl_2[(C_6H_5)_2PCH_2CH_2P(C_6H_5)_2]_2$ obtained by mixing anhydrous cobalt chloride $CoCl_2$ with 1,2-bis (diphenylphosphino)ethane in molar ratio 1:2 was charged to 50 cc. of monochlorobenzene in a 200-cc. autoclave along with 1 cc. of triethylaluminum as catalyst, after which 34.2 grams of butadiene were also added.

This mixture was then reacted by maintaining a constant ethylene pressure of 20 kg./cm.² One hour later, 45.4 grams of hexadiene-1,4 and 4.7 grams of hexadiene-2,4 were obtained. The yield of hexadienes reached an amount 98% of theory.

Example 2

0.167 gram of $CoCl_2[(C_6H_5)_2PCH_2CH_2P(C_6H_5)_2]_2$, prepared as described in Example 1, was charged to 50 cc. of toluene in an autoclave along with 1 cc. of triethyaluminum, followed by the addition also of 67 grams of butadiene. The reaction was then carried out for 55 minutes by maintaining an ethylene pressure at 70° C. of 20 kg./cm.² 82 grams of hexadienes were obtained and the reaction rate of the butadiene was 80%.

Examples 3–5

The reactions were carried out for 2 hours at an ethylene pressure of 50 kg./cm.² using 50 cc. of toluene and 1 cc. of $AlEt_3$ in all instances but, as the tertiary diphosphine complex, 0.1 millimol of

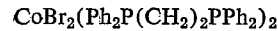

in Examples 3 and 4 and 0.1 millimol of

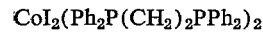

in Example 5. The amounts of butadiene used in Examples 3, 4 and 5 were respectively 43.5, 33.5 and 36.8 grams. The results obtained are tabulated below.

TABLE I

| Example | Butadiene, g. | Temperature, °C. | Hexadiene, g. |
|---|---|---|---|
| 3 | 43.5 | 88–90 | 8.1 |
| 4 | 33.5 | 82–88 | 10.8 |
| 5 | 36.8 | 87–90 | 56.1 |

As is apparent from the foregoing table, when

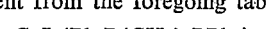

is present as the catalyst, not only is the activity high but the selectivity for formation of hexadiene-1,4 is also equally as good as in the instance of the use of a chloride complex.

Example 6

A magnetic rotary agitator equipped 200-cc. autoclave was charged with 20 cc. of toluene 0.08 gram of $CoCl_2(Ph_2PCH_2CH_2PPh_2)_2$ (also referred to as Co complex hereinafter), 33.5 grams of liquified butadiene and 2 cc. of triisobutylaluminum (100%), in the order given, following which the autoclave was sealed and the reaction temperature was raised to 80° C. while applying pressure with ethylene. The ethylene pressure was then adjusted to 50 kg./cm.², where it was held during the reaction period for 2 hours. After completion of the reaction, the catalyst was decomposed with a small quantity of methanol, extracted with water containing a small amount of hydrochloric acid, the organic layer was separated and after drying with anhydrous sodium sulfate yield 15.3 grams of hexadiene-1,4. The selectivity for hexadiene-1,4 was 93.6%.

Example 7

Two cc. of diisobutylaluminum hydride (100%) was used instead of the triisobutylaluminum of Example 6. After operating as in Example 6, 15.8 grams of hexadiene-1,4 and 1.1 grams of hexadiene-2,4 were obtained. The selectivity for hexadiene-1,4 was 88.5%.

Example 8

A rotary agitator-equipped 200-cc. autoclave was charged with 0.5 millimoles of anhydrous cobalt chloride and 20 cc. of toluene. This was followed by the addition of 1 millimole of 1,2-bis(diphenylphosphino)ethane, 67 grams of liquified butadiene and 1 cc. (about 7.3 millimols) of trimethylaluminum, in the order given, after which the autoclave was closed. The temperature was raised to 80° C. and the pressure of ethylene was brought up to 50 kg./cm.² After carrying out the reaction for 16.5 hours, the reaction mixture was treated in customary manner to yield 70.6 grams of hexadiene-1,4 and 5.6 grams of hexadiene-2,4. There was about 5.6 grams of the reaction mixture which could not be distilled by means of atmospheric distillation. The conversion of the butadiene was 84.5%, and the selectivity for hexadiene-1,4 was 83.5%.

Example 9

The procedures described in Example 8 were followed, except that instead of the anhydrous cobalt chloride 0.5 millimole of a hexahydrate of cobalt chloride was added, followed by the addition of 0.5 gram of 1,2-bis(diphenylphosphino)ethane. After carrying out the reaction for 4 hours using 33.5 grams of butadiene and an ethylene pressure of 35 kg./cm.², 31 grams of hexdadienes were obtained. The conversion of the butadiene was 67%, and the proportion of hexadiene-1,4 in the hexadienes was 93%. The selectivity for hexadiene-1,4 was 85.6%.

Examples 10–12

Except that the catalyst concentration, molar ratio of diphosphine to cobalt compound, the molar ratio of aluminum to cobalt, the ethylene pressure and reaction periods used were those shown in Table II, below, otherwise the procedures as described in Example 8 were followed with the results shown in said Table II.

Example 15

This example, along with Examples 16 and 17, shows how important the matter of selection of the solvent is.

When 0.09 gram of a cobalt complex was added to 4 cc. of ethylene chloride, a dark green solution was obtained. When after adding 50 cc. of toluene to this solution and also 33.5 grams of butadiene and 0.55 cc. of AlEt₃, the reaction was carried out for 2 hours at a temperature of 80–90° C. and an ethylene pressure of 54.5 kg./cm.², 38.6 grams of hexadiene-1,4, 2.2 grams of hexadiene-2,4 and 1.3 grams of other products were obtained.

On the other hand, when toluene was not added as the solvent and 67 grams of butadiene and 1 cc. of AlEt₃ were used, 59.6 grams of hexadiene-1,4, 16.5 grams of hexadiene-2,4 and 18.6 grams of a $C_8$ diolefins were obtained, and isomerization of the hexadiene took place at a high rate. $C_8$ diolefin is a compound obtained by the reaction of ethylene with hexadiene-2,4.

Example 16

When 0.09 gram of $CoCl_2[Ph_2PCH_2CH_2PPh_2]_2$ was dissolved in 50 cc. of tetrachloroethylene to which was then added 1 cc. of AlEt₃ and 36.2 grams of butadiene and the reaction was carried out for 2 hours at a temperature of 97.99° C. while maintaining the pressure at 40 kg./cm.² with ethylene, 57.3 grams of hexadiene-1,4 and 3.1 grams of hexadiene-2,4 were obtained. The conversion of the butadiene was practically 100%.

TABLE II

| Example | CoCl₂, mmole | Ph₂PCH₂CH₂PPh₂, mmole | Ethylene Pressure, kg./cm.² | Time, hr. | Hexadiene (HD), g. | HD-1,4 in HD, percent | HD-1,4 Selectivity, percent | g. HD/g. (Co+P) | P/Co, molar ratio | Al/Co, molar ratio |
|---|---|---|---|---|---|---|---|---|---|---|
| 10 | 0.1 | 0.2 | 45 | 17 | 66.4 | 91.2 | 86.4 | 713 | 2 | 73 |
| 11 | 0.2 | 0.1 | 40 | 2 | 58.9 | 97.7 | 77.7 | 892 | 0.5 | 36.5 |
| 12 | 0.1 | 0.1 | 35 | 3 | 28.6 | 98 | 87.3 | 655 | 1 | 73 |

Example 13

A 200-cc. autoclave equipped with a magnetic rotary agitator was charged with 0.09 gram of

50 cc. of toluene, 34.8 grams of liquified butadiene and 0.55 cc. of AlEt₃, in the order given, following which the autoclave was sealed. The reaction was carried out for 2 hours, adjusting the ethylene pressure to become 40 kg./cm.² at 140° C. Then by treating the reaction product in customary manner, 41.79 grams of hexadiene-2,4 were obtained. The amount of hexadiene-1,4 was 16.5 grams. Besides this, 6.79 grams of other distillation residues were obtained.

Example 14

The reaction was carried out following the procedures described in Example 13, except that 1.08 cc. of the AlEt₃ were used and the temperature during the first one hour was maintained at 130–140° C. while the temperature during the second one hour was raised to 168–170° C. Of the product obtained, hexadiene-2,4 amounted to 52.7 grams and hexadiene-1,4 to 1.2 grams, while conjugated dienes made up 96.5% of the hexadienes. Besides this, there was also observed a slight formation of hexadiene-1,3.

Example 17

When 50 cc. of ethylene chloride, 33.5 grams of butadiene, 0.09 gram of a cobalt complex and 0.5 cc. of AlEt₃ were reacted for 2 hours at 80° C. with an ethylene pressure of 40 kg./cm.², 38.3 grams of a diene of a molecular weight 110 ($C_8H_{14}$) composed of 1 butadiene molecule and 2 ethylene molecules were obtained. This was composed of two components, namely, 3-methylheptadiene-1,4 and 3-ethylhexadiene-1,4.

Examples 18–23

A. By reacting in liquid ammonia $NaP(C_6H_5)_2$, synthesized from metallic sodium and triphenylphosphine, with 1,3-dichloropropane, 1,3-bis(diphenylphosphino)propane was obtained as a white powder (M.P. 61–62° C.).

When foregoing diphosphine dissolved in toluene was mixed with anhydrous cobalt chloride suspended, in ethanol, a blue precipitate was obtained (M.P. 230–233° C.).

B. A 300-cc. autoclave was charged with 20 cc. of toluene, following which the $CoCl_2[Ph_2P(CH_2)_2PPh_2]_2$ prepared as hereinabove described, butadiene and trialkylaluminum were added as indicated in Table III, below. The reactions were then carried out at a temperature of 80–90° C. and an ethylene pressure of 50 kg./cm.² with the results shown below in Table III.

TABLE III

| Example | Cobalt Complex (mmole) | AlR₃, cc. | Butadiene, g. | Hexadiene-1,4, g. | Hexadiene-2,4, g. | Others, g. | Residue, g. | Reaction Time, hr. |
|---|---|---|---|---|---|---|---|---|
| 18 | 0.5 | AlEt₃, 0.7 | 20.5 | 13.4 | 20.8 | 5 | 3.1 | 19 |
| 19 | 0.5 | AlEt₃, 0.7 | 20.5 | 24.4 | 2.3 | 1.5 | 4 | 1 |
| 20 | 0.5 | AlEt₃, 0.2 | 100 | 105.8 | 0 | 18.4 | 5.8 | 2.6 |
| 21 | 0.25 | AlEt₃, 1.5 | 100 | 116.7 | 0 | 10.3 | 2.1 | 3 |
| 22 | 0.125 | AlEt₃, 1.5 | 100 | 51.8 | 0 | 4.1 | 2.2 | 3 |
| 23 | 0.25 | AlMe₃, 1.5 | 114 | 161.8 | 0 | 11.1 | 4.8 | 3 |

In Example 23, about 2.5 kg. or more of hexadiene-1,4 can be formed per gram of the cobalt complex.

Example 24

A rotary agitator-equipped 200-cc. autoclave was charged with 0.1 gram of the cobalt complex of Example 18, dissolved in ethylene chloride. Then, after adding 1.16 cc. of AlEt$_3$ and 85.7 grams of butadiene, the reaction was carried out for 2 hours at 98–102° C. while maintaining a pressure of 38 kg./cm.$^2$ with ethylene to yield 67.2 grams of hexadiene-1,4, 8.7 gram of 3-methyl-heptatriene (3-MHT) and 2.8 grams of other products.

Examples 25–26

Employing the apparatus described in Example 18 and as solvent 20 cc. of monochlorobenzene, the cobalt chloride and 1,3-bis(diphenylphosphino)propane were added separately, following which the aluminum compound and butadiene were added. The amounts added of the butadiene and ElEt$_3$ were 67 grams and 1 cc., respectively. The reactions were then carried out with an ethylene pressure of 60 kg./cm.$^2$ with the results shown in Table IV, below.

AlEt$_3$, and the reaction was carried out for 19 hours at 80° C. by charging ethylene to a pressure of 50 kg./cm.$^2$, 15.9 grams of a product of the following composition were obtained: 44.8% hexadiene-1,4, 17.8% hexadiene-2,4, 2.8% cyclohexene and 34.6% high boiling substances.

Example 31

A magnetic rotary agitator-equipped autoclave was first charged with 20 cc. of toluene, after which complex obtained from one millimole of 1,2-bis(diphenylphosphoryl)ethane

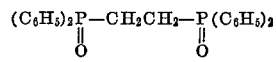

and 0.5 millimole of anhydrous cobalt chloride was added. Then, after adding 47 grams of butadiene and 1 cc. of AlEt$_3$, the autoclave was sealed followed by introduction of ethylene under pressure so as to maintain a pressure of 50 kg./cm.$^2$ at 80–90° C.

When the reaction was carried out for 3 hours with stirring, 90.5 grams of hexadiene-1,4 were obtained. The amount of hexadiene-2,4 by isomerization was 2.1 grams,

TABLE IV

| Example | CoCl$_2$, mmole | 1,3-bis(diphenyl-phosphino)propane, mmole | Temperature, ° C. | Time, hr. | Hexadiene-1,4, g. | Hexadiene-2,4, g. | Others, g. |
|---|---|---|---|---|---|---|---|
| 25 | 0.5 | 0.5 | 80 | 2 | 85 | 10 | 2.3 |
| 26 | 0.25 | 0.125 | 80–90 | 3 | 78.5 | 4.6 | 7.4 |

Example 27

The apparatus described in Example 18 was used, which was charged with 5 cc. of ethylene chloride, 0.125 millimole of cobalt chloride, 0.125 millimole of the diphosphine of Example 18 and 67 grams of butadiene, and 0.83 gr. AlEt$_3$ in the order given. When the reaction was then carried out for 3 hours at 80–90° C. under an ethylene pressure of 60 kg./cm.$^2$, 83.7 grams of hexadiene-1,4, 0.64 gram of 3-MHT and 1.7 grams of atmospheric distillation residue were obtained. It was confirmed the hexadiene-1,4 was obtained at the rate of 1,285 grams per gram of the cobalt and phosphine compound combined.

Example 28

A 100-cc. autoclave was charged with 20 cc. of toluene, 0.5 millimole of CoCl$_2$, 0.84 millimol of $$(C_2H_5)_2P—P(C_2H_5)_2$$

20.5 grams of butadiene and 5.11 millimoles of AlEt$_3$. When the reaction was then carried out for 17 hours at 80° C. by charging ethylene to a pressure of 50 kg./cm.$^2$, 28.4 grams of a product containing the following components were obtained, the proportion of which were 74.5% hexadiene-1,4, 6.2% hexadiene-1,3, 0.3% hexadiene-2,4, 1.7% cyclohexene, 9.6% 3-methylheptatriene-1,4,6, 3.7% n-octatriene-1,3,6, 1% vinyl cyclohexene and 6.9% high boiling substances.

Example 29

When a 100-cc. autoclave was charged with 20 cc. of toluene, 0.5 millimole of CoCl$_2$, 0.74 millimol of Et$_2$P—PEt$_2$, 30 cc. of butadiene and 10.95 millimoles of AlEt$_3$, and the reaction was carried out for 19 hours at 80° C. by charging ethylene to a pressure of 50 kg./cm.$^2$, 26.9 grams of a product of the following composition were obtained: 66.4% hexadiene-1,4, 17% hexadiene-2,4, 9.1% cyclohexene and 7.5% high boiling substances.

Example 30

When a 100-cc. autoclave was charged with 20 cc. of toluene, 0.5 millimole of CoCl$_2$, 0.84 millimole of Et$_2$P—PEt$_2$, 30 cc. of butadiene and 21.9 millimoles of and that of the atmospheric distillation residue was 1.45 grams. The conversion of the butadiene was 94.4%.

Example 32

Except that as the diphosphoryl

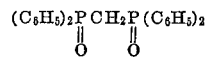

was used, the reaction was otherwise carried out as in Example 31 to yield 12 grams of hexadienes. In this case, 27.4 grams of the dimers of butadiene was produced as a by-product.

Example 33

One hundred cc. of B-B fraction containing 30% by volume of butadiene (50% by volume of isobutylene and 20% by volume of other C$_4$ isomers) and ethylene were reacted in the following manner. To an autoclave containing 20 cc. of toluene was added 0.09 gram of $$CoCl_2[(C_6H_5)_2PCH_2CH_2P(C_6H_5)_2]_2$$

dissolved in 10 cc. of ethylene chloride. Then, the foregoing B-B fraction and 1 cc. of Al(C$_2$H$_5$)$_3$ were also charged to the autoclave, following which ethylene was introduced up to a pressure of 50 kg./cm.$^2$ (100–102° C.) and the reaction was carried out for 2 hours.

After releasing the pressure, the product was given an extraction treatment with water containing a small amount of hydrochloric acid. When the organic layer was dried and the components were separated by gas chromatographic and distillation treatments, 21.1 grams of hexadiene-1,4, 2.4 grams of hexadiene-2,4 and 0.6 gram of C$_8$ dienes were obtained. The residue by atmospheric distillation amounted to about 1 gram. Products resulting from the reaction between isobutylene and ethylene and between isobutylene and butadiene were not obtained. The conversion of butadiene as calculated from the product was 84.2%.

Example 34

As in Example 33, the catalyst, solvent and reaction gases were charged into a magnetic rotary agitator-equipped 200-cc. autoclave. As the reaction gases, 100 cc. of a B-B fraction containing 50% by volume of butadiene (40% by volume of butene-1 and 10% by volume of other $C_4$ isomers) under pressure and ethylene under a pressure of 50 kg./cm.$^2$ were introduced.

When the reaction was carried out and the product treated as in Example 33, 31.6 grams of hexadiene-1,4, 2.06 grams of hexadiene-2,4 and 0.63 gram of atmospheric distillation residue were obtained. The conversion of the butadiene was 86.3%.

Example 35

The same procedures as described in Example 33 were followed, except that 100 cc. of the B-B fraction used was one which was condensed and collected from the cylinder, then regasified and again condensed by passing through a dry tube. As a result, 58.5 grams of hexadiene-1,4 were obtained.

Example 36

Twenty cc. of toluene, 0.08 gram of $$CoCl_2[(C_6H_5)_2PCH_2CH_2P(C_6H_5)_2]_2$$

33.5 grams of liquified butadiene, 30.5 grams of liquified propylene and 1 cc. of $(C_2H_5)_3Al$ were charged to a 200-cc. autoclave, in the order given, following which the reaction was carried out for 16.5 hours at 100° C. From the gas chromatograph of the product, two by-products close to the main product can be observed.

It was confirmed from various tests that this main product was 2-methyl hexadiene-1,4. This product amounted to 5.1 grams.

Example 37

A magnetic rotary agitator-equipped 200-cc. autoclave was charged with 40 cc. of toluene, 0.25 millimole of $CoCl_2$, 0.5 millimole of a cis type $$(C_6H_5)_2PCH{=}CHP(C_6H_5)_2$$

36.2 grams of butadiene and 1.03 cc. of $(C_2H_5)_3Al$, following which the autoclave was sealed. The reaction was then carried out for 2 hours at 94–100° C. by introducing ethylene up to a pressure of 50 kg./cm.$^2$ and maintaining this pressure during the reaction to yield 50.3 grams of hexadiene-1,4 and 2 grams of hexadiene-2,4 at a conversion for the butadiene of 98%. The atmospheric distillation residue amounted to 0.56 gram.

Example 38

Instead of the cis type in Example 37, a trans type $(C_6H_5)_2PCH{=}CHP(C_6H_5)_2$ was used. After a reaction for 2 hours at 102–106° C., 19.7 grams of hexadiene-1,4 and 2.1 grams of hexadiene-2,4 were obtained. Besides these, 4 grams of dimers of butadiene were obtained. The atmospheric distillation residue amounted to 0.63 gram and the conversion of the butadiene was 57.3%.

Example 39

A 100-cc. autoclave replaced with ethylene gas was charged with 0.356 gram (1 millimole) of cobalt (III) acetyl acetonate, 1,212 grams (2.2 millimole) of 1,2-bis(diphenylphosphino)ethane, 20 cc. of ethane and 2 cc. of diethylaluminum chloride and then stirred for 15 minutes at room temperature. Next, 32.4 grams (0.6 mole) of liquid butadiene were charged to the autoclave by means of distillation. The temperature was maintained at 50° C., the pressure was brought up to 20 kg./cm.$^2$ with ethylene, and stirring was continued for 2 hours. After cooling of the autoclave, the residual ethylene gas was discharged, and the catalyst was decomposed with dilute hydrochloric acid. As a result of this reaction, 42.5 grams of hexadiene-1,4 and 0.3 gram of hexadiene-2,4 were obtained. The high boiling distillation residue amounted to 1.4 grams.

Examples 40–46

A 100-cc. autoclave was charged with 0.178 gram (0.5 millimole) of cobalt (III) acetyl acetonate, 0.275 gram (0.5 millimole) of 1,2-bis(diphenylphosphino) ethane, 20 cc. of toluene and 1 cc. of diethylaluminum chloride, and the mixture was stirred for 15 minutes at room temperature. Then the autoclave was charged with 16.2 grams (0.3 mole) of butadiene, followed by stirring for 25 minutes at 80° C. under an ethylene pressure of 40 kg./cm.$^2$ to yield 23.6 grams of hexadiene-1,4 and 0.4 gram of hexadiene-2,4. The yield of hexadienes was 77% of theory.

Reactions were carried out using 0.5 millimole of the below-listed diphosphines instead of the 1,2-bis(diphenylphosphino)ethane, the other conditions being the same. The results obtained are shown in Table V, below.

TABLE V

| Example | Tertiary diphosphine | Hexadiene-1,4, g. | Hexadiene-2,4, g. |
|---|---|---|---|
| 41 | 1,1-bis(diphenylphosphino)methane | 12.1 | 1.2 |
| 42 | 1,2-bis(diphenylphosphino)ethylene | 22.6 | 0.2 |
| 43 | 1,3-bis(diphenylphosphino)propane | 23.7 | 0.4 |
| 44 | 1,4-bis(diphenylphosphino)butane | 17.4 | 1.3 |
| 45 | 1,2-bis(diphenylphosphino)benzene | 14.0 | 0.6 |
| 46 | 1,2-bis(diethylphosphino)ethane | 11.2 | 1.2 |

Example 47

A 100-cc. autoclave was charged with 20 cc. of toluene, 0.356 gram (1 millimole) of cobalt (III) acetyl acetonate, 1,212 grams (2.2 millimole) of 1,2-bis(diphenylphosphino)ethane, 2 cc. of ethylaluminum sesquichloride and 16.7 grams of butadiene, and the mixture was stirred for 23 hours at a reaction temperature of 50° C. and an ethylene pessure of 40 kg./cm.$^2$. 11.3 grams of hexadiene-1,4 and 0.8 gram of hexadiene-2,4 were obtained.

Example 48

Twenty cc. of toluene, 0.178 gram (0.5 millimole) of cobalt (III) acetyl acetonate, 0.550 gram (1 millimole) of 1,2-bis(diphenylphosphino) ethane, 1.5 cc. of ethylaluminum sesquibromide [$(C_2H_5)_3Al_2Br_3$] and 24 cc. of butadiene were charged to a 100-cc. autoclave and stirred for 2 hours at 80° C. and an ethylene pressure of 30 kg./cm.$^2$. 21 grams of hexadiene-1,4 and 2.1 grams of hexadiene-2,4 were obtained. The distillation residue amounted to 1.2 grams.

Example 49

A magnetic rotary agitator-equipped 200-cc. autoclave was charged with 50 cc. of toluene, 1 millimole of cobalt (III) acetyl acetonate [$Co(C_5H_7O_2)_3$], 1 millimole of 1,2-bis(diphenylphosphino)ethane, 47 grams of butadiene and 8 millimoles of diethylaluminum chloride. After sealing the autoclave, the reaction was carried out for 1 hour by maintaining an ethylene pressure of 50 kg./cm.$^2$ at 80–86° C. to yield 60 grams of hexadiene-1,4 and besides this 4.8 grams of hexadiene-2,4 and 11.6 grams of high boiling substances.

Example 50

Example 49 was repeated, but using ethylaluminum dichloride instead of the diethylaluminum chloride. The reaction was carried out for 1 hour at an ethylene pressure of 48 kg./cm.$^2$ at 100–101° C., using 60 cc. of butadiene, to yield 36.1 grams of hexadienes. Besides this, 4.4 grams of $C_8$ dienes were obtained.

Example 51

When ethylaluminum sesquichloride was used as the aluminum compound component under conditions identical to those of Example 49, 11.85 grams of hexadienes were obtained. Besides this 23.9 grams of high boiling substances were formed. Of the high boiling substances, 2.5 grams were $C_6$ dienes, and 3.4 grams were n-octatriene which is a dimer of butadiene.

Example 52

After charging a magnetic rotary agitator-equipped autoclave with 40 cc. of toluene, 0.5 millimole of cobalt (III) acetyl acetonate and 0.5 millimole of 1,2-bis(diphenylphosphino ethane, 33.5 grams of liquified butadiene and 36 grams of liquified propylene were also charged therein, after which finally 1 cc. of triethylaluminum was charged to the autoclave, which was then sealed. When the reaction was then carried out for 4 hours at 94–102° C., 21.5 grams of methylhexadiene were obtained. Tests confirmed that this was 2-methyl-1-cis-4-hexadiene. Further, cyclo-dimer of butadiene was formed as a by-product.

Example 53

A reactor, as used in Example 52, was charged with 1 millimole of cobalt (III) acetyl acetonate, 1 millimole of 1,2-bis(diphenylphosphino)ethane, 8.3 millimoles of diethylaluminum chloride. As a result of 5 hours of reaction at 96–100° C., 29.1 grams of 2-methyl hexadiene were obtained from 26.8 grams of liquified butadiene and 33 grams of liquified propylene.

Example 54

A magnetic agitator-equipped 200-cc. autoclave was charged in the presence of nitrogen with 80 cc. of toluene, 2 millimoles of anhydrous iron (III) chloride purified by sublimation, 20 cc. of butadiene and 1 millimole of 1,2-bis(diphenylphosphino)ethane. A glass ampoule filled with 1 cc. of triethylaluminum was placed gently in the autoclave. Starting with an initial pressure of ethylene of 100 kg./cm.$^2$, the reaction was initiated by stirring and breaking the ampoule when the temperature became 30° C. The reaction was stopped after 16 hours. As a result of this reaction, 8.1 grams of hexadiene 1,4 and 1.4 grams of distillation residue were obtained. The selectivity for $C_6$ dienes was 85.4%. The conversion of the butadiene was 50.6%, of which 80% was converted to $C_6$ dienes.

Example 55

Example 54 was repeated except that monochlorobenzene was used as the solvent, the procedures described in Examples 54 were otherwise followed. 11.8 grams of hexadiene-1,4 were obtained, though 1% thereof was isomerized to hexadiene-2,4. The high boiling residue amounted to 1.1 grams, and the selectivity for hexadiene-1,4 was 91.8%. The conversion of the butadiene was 61%, of which 88% thereof was hexadiene-1,4.

Example 56

Using the catalyst of Example 54 but by adding 67 grams of the butadiene, the reaction was carried out for 5 hours at 50° C. while maintaining an ethylene pressure of 70 kg./cm.$^2$. 35 grams of hexadiene-1,4 were obtained. The remainder was only 7 grams of high boiling residue.

Example 57

The reaction was carried out for 18 hours at 80° C. following the procedures described in Example 54, except that 20 cc. of monochlorobenzene, 2 millimoles of ferric chloride, 0.1 millimole of Ph$_2$PCH$_2$CH$_2$PPh$_2$ and 7.3 millimoles of AlEt$_3$ were used. As a result 51.3 grams of hexadiene-1,4, 1 gram of hexadiene-2,3 and 1.3 grams of other $C_6$ components were obtained. On the other hand, there were present 3.5 grams of dimers of butadiene and 37 grams of residue in the product.

Examples 58–62

The reactions were carried out in a 200-cc. autoclave for 2 hours (except that in the case of Example 62 the time was 18 hours) at 80° C. with an ethylene pressure of 68 kg./cm.$^2$, using as catalyst 2 millimoles of ferric chloride, 1 millimole of Ph$_2$PCH$_2$CH$_2$PPh$_2$ and 1 cc. of AlEt$_3$, but by varying the proportions of monochlorobenzene and liquid butadiene. The results obtained are shown in Table VI, below.

TABLE VI

| Example | Solvent, cc. | Butadiene, g. | Hexadiene-1,4, g. | Other Hexadienes, g. | Butadiene Dimers, g. | Residue, g. | Butadiene Conversion, Percent |
|---|---|---|---|---|---|---|---|
| 58 | 80 | 20.4 | 24.6 | 0.2 | 0.3 | 1.6 | 97.5 |
| 59 | 60 | 26.8 | 28.4 | 0.3 | | 1.9 | 78.8 |
| 60 | 20 | 53.5 | 52.0 | | 0.5 | 2.7 | 70.7 |
| 61 | 20 | 100 | 68.2 | | 1.8 | 7.8 | 55.2 |
| 62 | 20 | 100 | 88.8 | 4.9 | 7.3 | 11.3 | 81.1 |

It can be seen from the results tabulated hereinabove that the use of the solvent is effective in enhancing the selectivity for hexadiene-1,4.

Example 63

When the reaction was carried out as in Example 61, except that it was carried out for 16 hours at 80° C. using 1 millimole of the ferric chloride, 95.5 grams of hexadiene-1,4 2.3 grams of hexadiene-2,4, 4.4 grams of butadiene oligomer and 8.8 grams of residue were obtained.

Example 64

After charging a magnetic agitator-equipped 200-cc. autoclave with 20 cc. of toluene, 0.5 millimole (0.08 grams) of anhydrous ferric chloride, 0.5 millimole (0.19 gram) of Ph$_2$P    PPh$_2$ 50 cc. of liquified butadiene and 1 cc. of triethylaluminum, it was sealed. When the reaction was carried out for 2.5 hours by bringing ethylene up to a pressure of 60 kg./cm.$^2$ while maintaining a temperature of 80–90° C., 23.9 grams of hexadiene-1,4 were obtained. Besides this, 5.4 grams of butadiene dimers and 15.5 grams of distillation residue were obtained.

Example 65

The procedures described in Example 64 were followed, except that 0.5 millimole of Ph$_2$PCH$_2$CH$_2$PPh$_2$ was used as the tertiary diphosphine and 67 grams of butadiene was used, with the consequence that 100.5 grams of hexadiene-1,4 were obtained. The distillation residue amounted to 2.6 grams.

Examples 66–67

A magnetic agitator-equipped 200-cc. autoclave was charged with 20 cc. of toluene, and as catalyst 2 millimoles of FeCl$_2$, 1 millimole of $(C_6H_5)_2PCH_2CH_2P(C_6H_5)_2$ and the below-listed aluminum compounds. Then, after adding 120 grams of butadiene, the reactions were carried out for 2 hours at 80° C. by applying a pressure of 60 kg./cm.$^2$ with ethylene. The results tabulated below were obtained.

TABLE VII

| Example | Aluminum Compound | Hexadiene-1,4, g. | Others, g. | Residue, g. | Butadiene Conversion, Percent |
|---|---|---|---|---|---|
| 66 | Al(i-Bu)$_2$H (1 cc.). | 61.5 | 2.9 | 5.1 | 73.4 |
| 67 | AlEt$_2$Cl (1 cc.). | 18.9 | | 2.7 | 24.4 |

Example 68

A 200-cc. autoclave was charged with 20 cc. of monochlorobenzene and 67 grams of liquified butadiene, and as catalyst were used 0.5 millimole of ferric bromide, 0.5 millimole of $(C_6H_5)_2PCH_2CH_2P(C_6H_5)_2$ and 7.3 millimoles of $AlEt_3$. When this system was reacted for 17 hours at 80° C. by applying a pressure of 40 kg./cm.² with ethylene, 73.9 grams of hexadiene-1,4 were obtained.

When the amount of the iron component and the tertiary diphosphine were both reduced to ⅕ of that indicated hereinabove, the yield of the hexadiene-1,4 was 30 grams with 2.6 grams of distillation residue.

Example 69

A 200-cc. autoclave was charged with 20 cc. of toluene, 1 millimol of $(C_6H_5)_2P(O)CH_2CH_2P(O)(C_6H_5)_2$, 0.5 millimole of anhydrous ferric chloride, 67 grams of liquified butadiene and 1 cc. of $AlEt_3$. After sealing the autoclave, the reaction was carried out for 1 hour at 82–98° C. while maintaining a pressure of 50 kg./cm.² by applying pressure to the system with ethylene. 18.4 grams of hexadienes were obtained, of which 89.2% was hexadiene-1,4.

Example 70

A 200-cc. autoclave was charged with 20 cc. of toluene, 2 millimoles of $FeCl_3$, 1 millimole of cis type

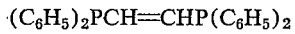

67 grams of butadiene and 1 cc. of $(C_2H_5)_3Al$, and sealed, following which the reaction was carried by applying pressure with ethylene. The reaction was continued for 3 hours while maintaining the ethylene pressure at 50–60 kg./cm.² at 82–88° C. As a result, 64.3 grams of hexadiene-1,4 were obtained. The other products included hexadiene-1,5-hexadiene-2,4 and $C_8$ dienes totaling 10.4 grams, and 17.6 grams of distillation residue. The conversion of butadiene was 97.3%.

Example 71

When Example 70 was repeated except that instead of the cis type a trans type $(C_6H_5)_2PCH=CHP(C_6H_5)_2$ was used, the amount formed of hexadiene-1,4 was 40 grams. The conversion of the butadiene was 55.3%.

Example 72

A 100-cc. autoclave was charged with 0.168 gram (0.5 millimole) of iron (III) acetyl acetonate, 0.550 gram (1 millimole) of 1,2-bis(diphenylphosphino) ethane, 20 cc. of toluene and 1 cc. of diethylaluminum chloride, and the mixture was stirred for 15 minutes at room temperature. Next, 17.4 grams of butadiene was charged to the autoclave, followed by stirring the mixture for 20 minutes at 80° C. under an ethylene pressure of 40 kg./cm.². 22.5 grams of hexadiene-1,4 and 0.4 gram of hexadiene-2,4 were obtained. The high boiling residue amounted to 1 gram.

Example 73

A 100-cc. autoclave was charged with 10 cc. of monochlorobenzene, 0.08 g. of $FeCl_3$, 1 millimole of 1,2-bis(diphenylphosphino) ethane, 50 cc. of isoprene and 1 cc. of $(C_2H_5)_3Al$, and after sealing the autoclave, the reaction was carried out for 15 hours at a temperature of 80° C. and an ethylene pressure of 40 kg./cm.². The total amount of product was 10.7 grams, of which 76.5% was methyl-hexadiene-1,4 and 6.6% was methyl-hexadiene-2,4. The conversion of the isoprene was 23.7%, while the yield of the methyl-hexadiene-1,4 was 71.6%.

Example 74–82

Isoprene and ethylene were reacted, using as catalyst

and $(C_2H_5)_3Al$ in the amounts indicated in Table VIII(a) below, whereby was obtained the results shown in Table VIII(b) below.

TABLE VIII(a)

| Example | Solvent, cc. | CoCl₂(DPE*)₂, g. | (C₂H₅)₃Al, cc. | Isoprene, cc. | Ethylene, kg./cm.² | Reaction Temperature, °C. | Reaction Time, hr. | Reaction Mixture, g. |
|---|---|---|---|---|---|---|---|---|
| 74 | (CH₂Cl)₂, 20 | 0.4634 | 0.69 | 50 | 40 | 100 | 5 | 75 |
| 75 | Xylene, 20 | 0.08 | 1 | 50 | 40 | 100 | 5 | 50.7 |
| 76 | (CH₂Cl)₂, 20 | 0.08 | 1 | 50 | 40 | 50 | 5 | 61 |
| 77 | (CH₂Cl)₂, 20 | 0.08 | 1 | 50 | 40 | 100 | 5 | 61.9 |
| 78 | (CH₂CL)₂, 20 | 0.08 | 1 | 100 | 40 | 100 | 5 | 118.4 |
| 79 | (CH₂Cl)₂, 20 | 0.08 | 1 | 150 | 40 | 100 | 5 | 133.8 |
| 80 | | 0.08 | 1 | 100 | 40 | 100 | 5 | 89.3 |
| 81 | | 0.08 | 1 | 100 | 40 | 80 | 5 | 89.9 |
| 82 | | 0.08 | 1 | 150 | 40 | 100 | 5 | 132.8 |

*DPE = $(C_6H_5)_2P \cdot CH_2CH_2 \cdot P(C_6H_5)_2$.

TABLE VIII(b)

| Example | Product, g. | | | | | Isoprene Conversion, percent | Activity | | Isomerization Rate,* percent | 4-Methyl-1,4-hexadiene content |
|---|---|---|---|---|---|---|---|---|---|---|
| | Methyl-1,4-hexadiene | Methyl-2,4-hexadiene | C₉ Dienes | Others | High Boiling Substances | | Methyl-1,4-hexadiene, g./g., Co compound | Methyl-1,4-hexadiene, g./g., catalyst | | |
| 74 | 0.7 | 3.4 | 30.9 | 3.7 | 0.64 | n.d. | | | n.d. | n.d. |
| 75 | 28.2 | 0.9 | | | 1.3 | 61 | 353 | 31.1 | 3.1 | 85.7 |
| 76 | 29.9 | 9.2 | | | 0.61 | 78.3 | 373 | 32.9 | 23.4 | 100 |
| 77 | 7.5 | 3.6 | 11.4 | | 1.45 | 48.4 | 94.2 | 8.3 | 62.3 | 100 |
| 78 | 16.3 | 39.9 | 20.4 | 10.6 | 1.97 | 89.3 | | | 80.3 | 100 |
| 79 | 67.9 | 5.6 | | | 3.2 | 51 | 849 | 74.7 | 7.6 | 81.3 |
| 80 | 77.6 | 11 | | | 0.85 | 88 | 970 | 85.4 | 12.4 | 90.3 |
| 81 | 62 | 16.4 | | | 0.42 | 77.5 | 775 | 68.1 | 20.9 | 97.6 |
| 82 | 118 | 7.3 | | | 1.12 | 83.2 | 1,475 | 129.7 | 5.8 | n.d. |

*Isomerization rate = [{(C₇+C₉) − (methyl-1,4-hexadiene)} g./(C₇+C₉)g.]×100.
n.d. = not determined.

Examples 83-88

When butadiene is reacted with propylene using the catalysts indicated in Table IX(a) below, the results shown in Table IX(b) below, are obtained.

TABLE IX(a)

| Example | Solvent, cc. | Cobalt Compound, g. | Organoaluminum Compound, cc. | 3rd Component, g. | Butadiene, cc. | Propylene, cc. | Reaction Temperature, °C. | Reaction Time, hr. |
|---|---|---|---|---|---|---|---|---|
| 83 | Ethylene chloride, 20 | CoCl$_2$(DPE)$_2$, 0.08 | (C$_2$H$_5$)$_3$Al, 1 | | 34 | 56 | 90-100 | 5 |
| 84 | Toluene, 40 | Co(acac*)$_3$, 0.18 | (C$_2$H$_5$)$_3$Al, 1 | DPE, 0.199 | 50 | 60 | 90-120 | 4 |
| 85 | do | do Co(acac*)$_3$, 0.35 | (C$_2$H$_5$)$_2$AlCl, 1 | DPE, 0.398 | 40 | 55 | 90-100 | 5 |
| 86 | Ethylene chloride, 20 | Co(acac*)$_3$, 0.18 | (C$_2$H$_5$)$_3$Al, 1 | DPE, 0.199 | 34 | 56 | 90-100 | 5 |
| 87 | do | do CoCl$_2$, 0.013 | (C$_2$H$_5$)$_3$Al, 1 | DPE, 0.082 | 34 | 56 | 90-100 | 5 |
| 88 | do | do Co(acac)$_3$, 0.036 | (C$_2$H$_5$)$_3$Al, 1 | DPPT, 0.082 | 34 | 56 | 90-100 | 5 |

*DPP=(C$_6$H$_5$)$_2$PCH$_2$CH$_2$CH$_2$P(C$_6$H$_5$)$_2$.  †acac=(C$_5$H$_7$O$_2$).

TABLE IX(b)

| Example | Product, g. | | | | | | Butadiene Conversion, percent | 2.methyl-1,4-hexadiene in Total Product, percent |
|---|---|---|---|---|---|---|---|---|
| | n-Heptadiene | 2-methyl-1,4-hexadiene | 2-methyl-1,3-hexadiene | Butadiene Dimers | Others | Residue | | |
| 83 | 1.2 | 9.4 | 0.5 | 2.6 | 0.1 | 1.6 | 42.9 | 61 |
| 84 | 1.5 | 21.5 | 0.77 | 11.9 | | 2.1 | 81.8 | 57 |
| 85 | 1.2 | 29.1 | 1.5 | 7.9 | | 2.1 | ~100 | 69.1 |
| 86 | 1.7 | 21.4 | 1.2 | 3.45 | 0.6 | 2.7 | 90.5 | 64.5 |
| 87 | 1.5 | 18 | 0.7 | 2.04 | 0.5 | 1 | 67.1 | 75.2 |
| 88 | 1.25 | 22.1 | 0.9 | 1.8 | | 1.3 | 76 | 80.8 |

We claim:
1. A process for preparing hexadienes which comprises reacting an α-monoolefin with a conjugated diolefinic hydrocarbon in the presence of a catalytic amount of a three-component catalyst comprising:
   (1) a compound selected from the group consisting of
      (a) compound of the formula M(C$_5$H$_7$O$_2$)$_n$ where M is a metal selected from cobalt and iron, and $n$ is equal to the valence of said metal; and
      (b) compounds of the formula MX$_n$, where X is halogen, and M and $n$ have the meanings defined above; and
   (2) an organophosphorus compound selected from the group consisting of
      (a) compounds of the formula R$_2$P(R')$_n$PR$_2$, where R is a member selected from alkyl and aryl, R' is a member selected from alkylene, alkenylene and arylene, and $n$ is an integer from 0 to 1; and
      (b) compounds of the formula

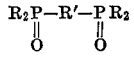

where R and R' have the meanings defined above; and
   (3) an organoaluminum compound of the formula R''$_m$AlZ$_{3-m}$, where R'' is a monovalent hydrocarbon group, Z is a member selected from hydrogen and halogen and halogens, and $m$ is a number from 1 to 3.

2. The process according to claim 1 wherein said alpha-monoolefin is ethylene.

3. The process according to claim 1 wherein said alpha-monoolefin is propylene.

4. The process according to claim 1 wherein said conjugated diolefinic hydrocarbon is butadiene.

5. The process according to claim 1 wherein said conjugated diolefinic hydrocarbon is isoprene.

6. The process according to claim 1 wherein said components (1) and (2) are contained in a molar ratio of (2)/(1) ranging between 0.1:1 and 5:1.

7. The process according to claim 1 wherein said components (1) and (2) are contained in a molar ratio of (3)/(1) ranging between 0.5:1 and 200:1.

8. The process according to claim 1 wherein said reaction is effected at a temperature ranging between 10° and 100° C.

9. A process for preparing hexadienes which comprises reacting an α-monoolefin with a conjugated diolefinic hydrocarbon in the presence of a catalytic amount of a three-component composition comprising:
   (1) a compound of the formula CoX$_2$, wherein X is a member selected from the group consisting of chlorine, bromine and iodine atoms;
   (2) a compound selected from
      (a) compounds of the formula $$(C_6H_5)_2P-R'-P(C_6H_5)_2$$

where R' is an alkylene group selected from the group consisting of ethylene and 1,3-propylene [groups]; and
      (b) compounds of the formula

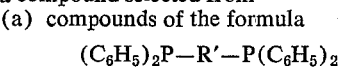

where R' has the meaning defined above; and
   (3) a compound of the formula R''$_m$AlZ$_{3-m}$, where R'' is an alkyl group of 1 to 4 carbon atoms; Z is a member selected from hydrogen and halogens; and $m$ is selected from 3, 2, and 1.5;
   the molar ratio of said component (2) to said component (1) being in the range between 0.1:1 and 5:1, and the molar ratio of said component (3) to said component (1) being in the range between 0.5:1 and 200:1.

10. The process according to claim 6 wherein a cobalt complex is prepared in advance by combining and mixing said component (1) and said component (2) in molar ratio selected from 1:1 and 1:2.

11. The process according to claim 6 wherein said catalyst composition is present in an amount wherein Co is present at the rate of 10$^{-4}$ to 10$^{-2}$ moles for every one mole of said conjugated diolefinic hydrocarbon.

References Cited

UNITED STATES PATENTS

| | | | |
|---|---|---|---|
| 3,219,716 | 11/1965 | Wittenberg et al. | |
| 3,244,678 | 4/1966 | Tocker | 260—85.3 |
| 3,306,948 | 2/1967 | Kealy | 260—680 |
| 3,309,418 | 3/1967 | Hata | 260—680 |

PAUL M. COUGHLAN, Jr., *Primary Examiner.*